(12) United States Patent
Fourney et al.

(10) Patent No.: US 10,183,814 B2
(45) Date of Patent: Jan. 22, 2019

(54) CONVEYOR SYSTEMS AND METHODS

(71) Applicant: Laitram, L.L.C., Harahan, LA (US)

(72) Inventors: Matthew L. Fourney, Laurel, MD (US); Stephen G. Wargo, Laurel, MD (US)

(73) Assignee: Laitram, L.L.C., Harahan, LA (US)

(*) Notice: Subject to any disclaimer, the term of this patent is extended or adjusted under 35 U.S.C. 154(b) by 69 days.

(21) Appl. No.: 14/925,497

(22) Filed: Oct. 28, 2015

(65) Prior Publication Data

US 2016/0046450 A1 Feb. 18, 2016

Related U.S. Application Data

(60) Continuation of application No. 14/018,006, filed on Sep. 4, 2013, now Pat. No. 9,199,281, which is a
(Continued)

(51) Int. Cl.
*B07C 1/12* (2006.01)
*B07B 13/05* (2006.01)
(Continued)

(52) U.S. Cl.
CPC ............. *B65G 47/28* (2013.01); *B07B 13/05* (2013.01); *B07C 1/12* (2013.01); *B65G 15/30* (2013.01);
(Continued)

(58) Field of Classification Search
CPC ........ B65G 47/28; B65G 47/71; B65G 15/30; B07B 13/05
(Continued)

(56) References Cited

U.S. PATENT DOCUMENTS 3,627,091 A * 12/1971 Fleischauer .......... B65G 13/075
193/35 A
3,713,421 A * 1/1973 Rash ..................... B65G 21/02
118/239
(Continued)

FOREIGN PATENT DOCUMENTS

DE 9417627 U1 12/1994
GB 842214 A 7/1960
(Continued)

OTHER PUBLICATIONS

Extended European Search Report, European Patent Application No. 15150830.6-1707, dated May 20, 2015.
(Continued)

*Primary Examiner* — Terrell H Matthews
(74) *Attorney, Agent, or Firm* — James T. Cronvich

(57) ABSTRACT

A conveyor system and methods for conveying and unstacking flat and non-flat packages. The conveyor system includes an inclined conveyor belt delivering packages to a tilted conveyor belt that conveys flat packages along its length while non-flat packages tumble off its lower side edge to initially cull flat packages from a bulk flow of packages. Retention means, such as a high-friction outer conveying surface or a raised barrier along the length of the outer conveying surface of the tilted conveyor belt, holds flat packages on the tilted conveyor belt. The inclined conveyor belt has stop elements spaced apart along the belt's length and is advanced in stop-and-go fashion to help unstack piggy-backed packages as they are conveyed up the incline. The initially separated packages are more fully culled in a conveyor comprising a roller conveyor belt with package-supporting belt rollers rotated in a direction to push packages sidewise toward a culling element that extends along the length of the roller conveyor belt.

10 Claims, 4 Drawing Sheets

Related U.S. Application Data division of application No. 13/040,919, filed on Mar. 4, 2011, now Pat. No. 8,528,742.

(60) Provisional application No. 61/311,610, filed on Mar. 8, 2010.

(51) Int. Cl.

| | | |
|---|---|---|
| *B65G 47/28* | (2006.01) | |
| *B07B 9/00* | (2006.01) | |
| *B65G 17/24* | (2006.01) | |
| *B65G 47/71* | (2006.01) | |
| *B65G 15/30* | (2006.01) | |
| *B65G 59/02* | (2006.01) | |
| *B65G 47/68* | (2006.01) | |

(52) U.S. Cl.
CPC ............. *B65G 17/24* (2013.01); *B65G 47/68* (2013.01); *B65G 47/71* (2013.01); *B65G 59/02* (2013.01)

(58) Field of Classification Search
USPC ................................. 209/659, 12.1, 34, 44.1
See application file for complete search history.

(56) References Cited

U.S. PATENT DOCUMENTS

| | | | | |
|---|---|---|---|---|
| 3,905,491 | A * | 9/1975 | Harrison | B65G 47/50 198/349.8 |
| 3,988,017 | A * | 10/1976 | Kyhl | B65H 3/045 271/111 |
| 5,001,951 | A * | 3/1991 | Eisenlohr | B65B 69/0033 131/96 |
| 5,069,440 | A | 12/1991 | Lazzarotti et al. | |
| 5,333,738 | A | 8/1994 | Fuchs et al. | |
| 5,660,283 | A * | 8/1997 | Groh | B65G 19/14 198/690.2 |
| 5,687,831 | A | 11/1997 | Carlisle | |
| 6,170,646 | B1 * | 1/2001 | Kaeb | B65G 15/08 198/819 |
| 6,321,913 | B1 * | 11/2001 | Rebel | B07C 1/02 209/509 |
| 6,690,995 | B2 * | 2/2004 | Prutu | B07C 1/10 198/572 |
| 8,051,972 | B1 * | 11/2011 | LaRosa | B65G 27/24 198/468.01 |
| 9,181,033 | B2 * | 11/2015 | Stenson | B65G 19/14 |
| 9,260,247 | B2 * | 2/2016 | Miller | B65G 15/58 |
| 2002/0139643 | A1 * | 10/2002 | Peltier | B65G 15/08 198/821 |
| 2014/0166443 | A1 * | 6/2014 | Shinobu | B65G 17/24 198/779 |

FOREIGN PATENT DOCUMENTS

| | | |
|---|---|---|
| GB | 2168625 A | 6/1986 |
| JP | 6241753 U | 3/1987 |
| JP | 63131904 U | 8/1988 |
| JP | H0283075 U | 6/1990 |
| JP | H04267977 A | 9/1992 |
| JP | 05319551 A | 12/1993 |
| JP | H08131963 A | 5/1996 |
| JP | 09085179 A | 3/1997 |
| JP | 11059882 A | 3/1999 |
| JP | 2001019145 A | 1/2001 |
| JP | 2001191033 A | 7/2001 |
| JP | 2005225617 A | 8/2005 |
| JP | 2006218466 A | 8/2006 |
| JP | 2007098298 A | 4/2007 |
| JP | 2008280156 A | 11/2008 |
| WO | 2006020707 A2 | 2/2006 |

OTHER PUBLICATIONS

Extended European Search Report, European Patent Application No. 16184080.6, dated Dec. 15, 2016, European Patent Office, Munich, Germany.

\* cited by examiner

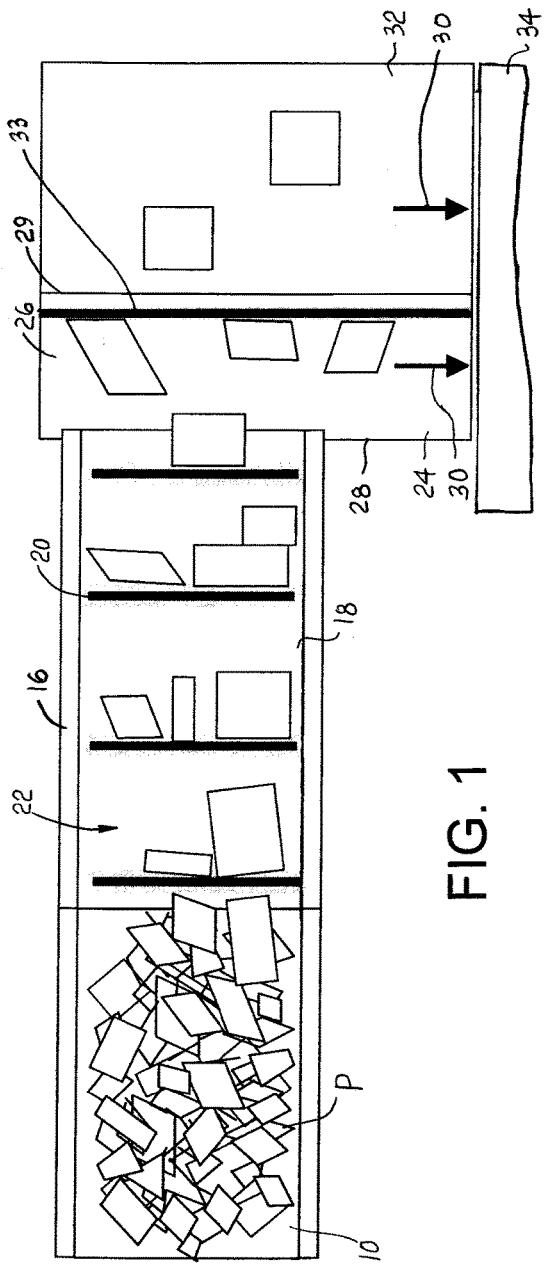
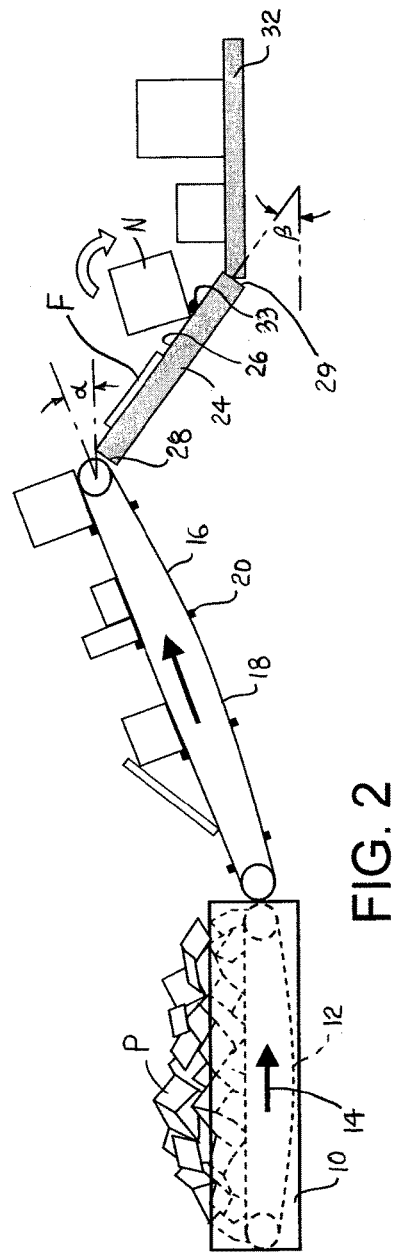
FIG. 1
FIG. 2

CONVEYOR SYSTEMS AND METHODS

CROSS-REFERENCE TO RELATED APPLICATIONS

This application is a continuation application of co-pending U.S. patent application Ser. No. 14/018,006, filed Sep. 4, 2013, which is a divisional of U.S. patent application Ser. No. 13/040,919, filed Mar. 4, 2011, now U.S. Pat. No. 8,528,742, which claims the priority of U.S. Provisional Patent Application No. 61/311,610, "Package-Culling Conveyor System and Method," filed Mar. 8, 2010. All these prior applications are incorporated into this application by reference.

BACKGROUND

The application relates generally to power-driven conveyors and more particularly to conveyor systems and associated methods for using conveyor belts to unstack and separate a bulk supply of flat packages and non-flat packages.

In the postal and parcel industries, envelopes are culled from a bulk flow of packages that include envelopes, boxes, tubes, and other mail. Typically, the culling is performed by postal workers who manually pluck envelopes from a mass flow of packages. This work is labor intensive.

SUMMARY

One version of a conveyor system embodying features of the invention comprises a conveyor belt having a conveying surface advancing packages up an incline from a lower end to an upper end. Stop elements extend across the width of the conveying surface of the conveyor belt at spaced apart locations along the length of the conveyor belt to block packages sliding down the inclined conveying surface. The conveyor belt advances up the incline with a continuous pulsing motion to help unstack stacked packages on the conveying surface.

In another aspect of the invention, a method unstacking packages being conveyed up an incline comprises: (a) arranging a conveyor belt having spaced apart stop elements extending across the width of the conveying surface at spaced apart locations along the length of the conveyor belt on an incline from a lower end to an upper end; (b) advancing the conveyor belt up the incline in a continuous pulsing motion to cause packages stacked atop other packages on the conveying surface to slide downward on the conveying surface of the conveyor belt on the incline; and (c) stopping the downward slide of the previously stacked packages with the stop elements.

BRIEF DESCRIPTION OF THE DRAWINGS

These features and aspects of the invention, as well as its advantages, are described in more detail in the following description, appended claims, and accompanying drawings, in which:

FIG. 1 is a top plan schematic of a portion of a package-culling conveyor system embodying features of the invention;

FIG. 2 is a side elevation schematic of the portion of the conveyor system shown in FIG. 1;

DETAILED DESCRIPTION

Figure 3:
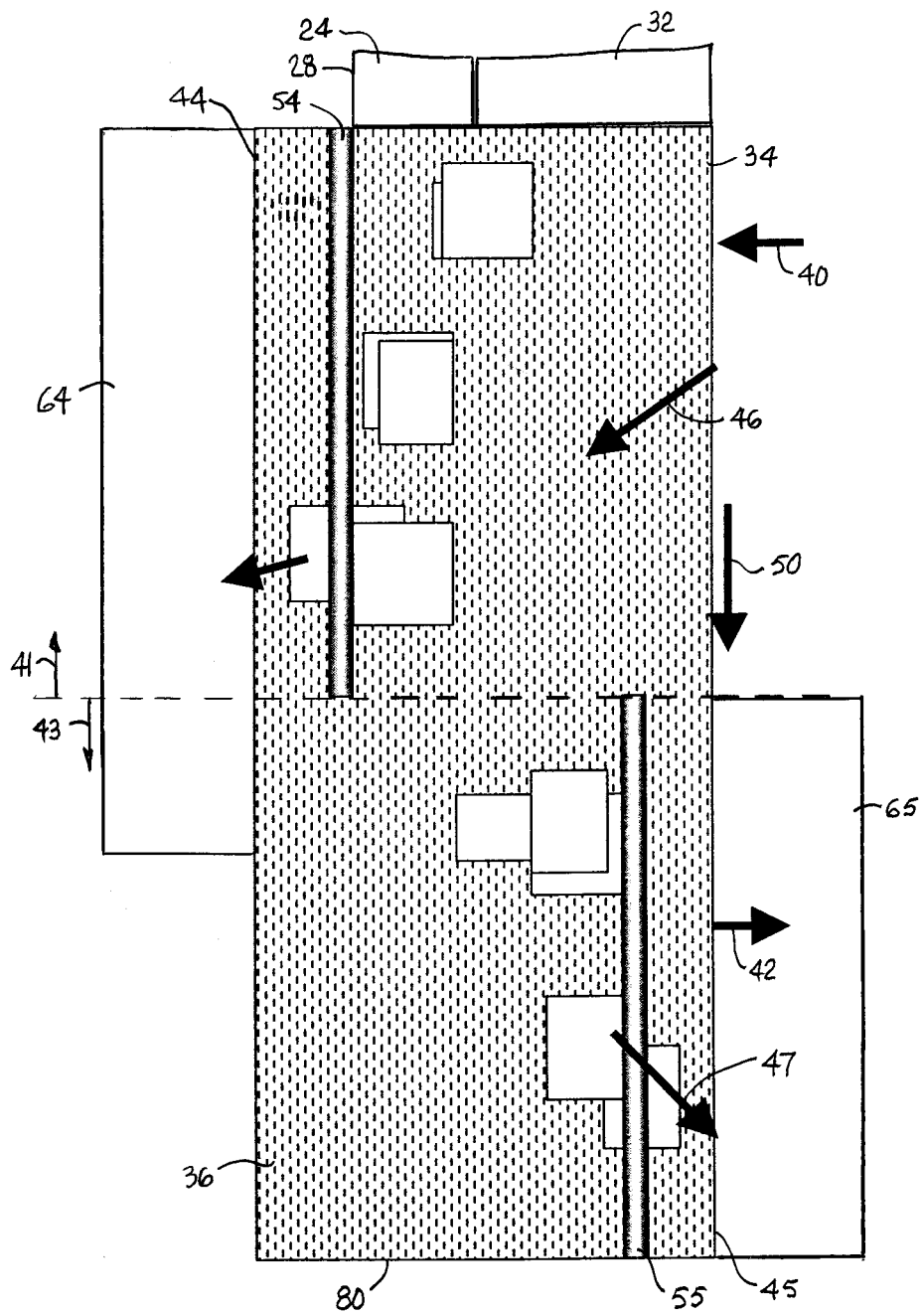
FIG. 3 is a top plan schematic of a culling conveyor belt usable in the conveyor system of FIG. 1.

A conveyor system for culling flat packages from a bulk supply of packages to separate flat packages from non-flat packages is shown in FIGS. 1-3. As used in this description, the term "flat packages" refers to envelopes and other packages that have a small thickness; the term "non-flat packages" refers to packages, such as boxes and tubes that are not "flat packages." A bulk supply of packages P from which flat packages are to be culled is dumped on an infeed conveyor 10. The infeed conveyor may be realized as a belt conveyor having a belt 12, which may be a flat belt or a flat-top modular plastic conveyor belt. The belt conveys the packages in bulk in a conveying direction 14 to an incline conveyor 16.

The incline conveyor shown is an inclined conveyor belt 18 having stop elements 20, such as short flights, extending across the width of the belt at regular intervals along its length. The stop elements may extend across the entire width as shown or may extend across half the width staggered from the left-side half to the right-side half of the belt. The stop elements divide the conveying surface of the inclined belt 18 into bins 22, each containing a batch of packages received from the bulk flow supplied by the infeed conveyor. The incline conveyor is inclined off horizontal at an inclination angle α that is sufficient to allow larger non-flat packages and even flat packages at the top of a stack to tumble or slide backward until they reach the stop elements. The inclined conveyor belt 18 advances up the incline with a continuous start-and-stop motion. The jerky, pulsing motion of the belt also helps in the unstacking and unshingling of stacked packages. Rubber or other high-friction pads or areas on the inclined belt's conveying surface may be used instead of flights to serve as stop elements. The pads provide enough friction to prevent packages from sliding past.

The inclined conveyor belt 18 drops packages off its upper end onto a tilted conveyor belt 24. The tilted conveyor belt can be realized as a flat rubber belt or a modular plastic friction-top belt, such as an INTRALOX® Series 1400 Friction Top belt or an INTRALOX® Series 900 Diamond Friction Top belt manufactured and sold by Intralox, L.L.C. of Harahan, La., U.S.A. The outer conveying surface 26 of these modular high-friction belts is largely covered by a high-friction elastomer. As an alternative, the tilted belt may be made high-friction by texturing a normally low-friction outer conveying surface. In any event, the outer surface's frictional characteristics, such as the coefficient of friction the belt presents to the bottoms of packages, and the tilt angle β of the belt are selected to hold flat packages F whose bottoms rest on the outer conveying surface to the belt, while allowing non-flat packages N to tumble downward from an elevated side edge 28 of the tilted belt across the belt and past a lower side edge 29. Of course, flat packages that are stacked atop other packages or that drop to the tilted conveyor on edge are likely to fall past the lower side edge along with the tumbling non-flat packages. The tilted conveyor belt 24 conveys the retained flat packages F in a direction of belt travel 30. A horizontal collection conveyor 32 parallel and adjacent to the lower side edge 29 of the tilted conveyor belt 24 receives all the non-flat packages N and the few flat packages that tumble off the tilted belt and conveys them in the direction of belt travel 30. Both the tilted conveyor belt 24, which conveys mostly flat packages, and the horizontal conveyor 32, which conveys mostly non-flat packages, feed those initially separated packages onto a culling conveyor 34 to provide further culling if necessary.

Although the high-friction outer conveying surface of the tilted conveyor belt described constitutes one kind of retention means used to prevent flat packages from sliding off the lower side edge of the tilted conveyor belt, other retention means may be used. For example, a raised barrier 33 upstanding from the outer conveying surface 26 and extending along its length near the lower side edge 29 of the tilted conveyor belt 24 is another retention means that could be used to catch the flat packages and prevent them from sliding off the lower side edge. If a raised barrier is used, the conveying surface does not necessarily have to exhibit high-friction characteristics. The height of the barrier can be slight, as long as it is high enough to stop flat packages whose bottoms are sitting on the outer conveying surface from sliding past. The barrier may be continuous along the length of the tilted conveyor belt, or it may be segmented.

Figure 4:
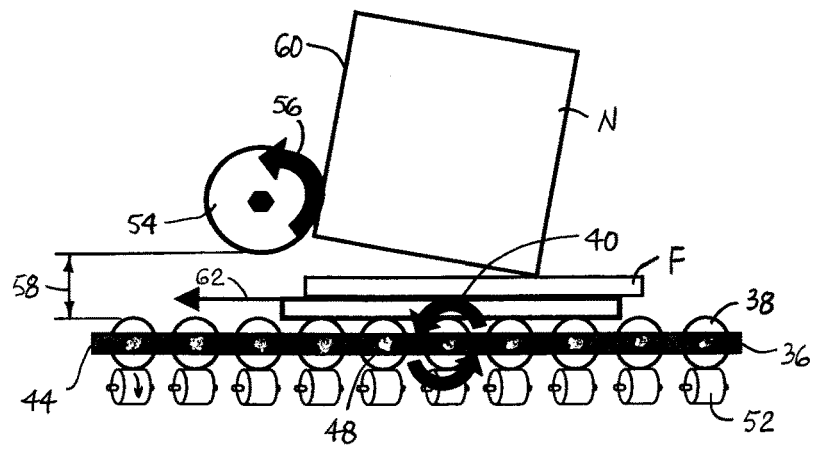
FIG. 4 is a front elevation schematic of a portion of the culling conveyor of FIG. 3 showing a powered roller lifting non-flat packages off flat packages.

The culling conveyor 34 includes a roller conveyor belt 36 (also shown in FIGS. 4-6) that has package-supporting rollers 38 protruding from its outer surface. The rollers are arranged to rotate in a first direction 40 in an upstream portion 41 of the culling conveyor 34 and in a reverse direction 42 in a downstream portion 43. In this way, packages are pushed toward a first side of the roller conveyor belt in the upstream portion along a trajectory more or less in the direction of arrow 46 and toward an opposite second side 45 in the downstream portion along a trajectory more or less in the direction of arrow 47. The roller conveyor belt 36 is realized as an INTRALOX® Series 7000 roller belt in which the rollers 38 extend through the thickness of the belt and rotate on axes 48 parallel to the travel direction 50 of the belt. The rollers are actuated in the upstream portion of the conveyor by passive actuating rollers 52 mounted to the conveyor frame on which the belt rollers ride as the roller belt advances in the travel direction (out of the page in FIG. 4). One version of such an actuated roller-belt conveyor is described in U.S. Pat. No. 7,506,751, "Conveyor Systems for Diverting Objects," Matthew L. Fourney, issued Mar. 24, 2009. The disclosure of that patent is incorporated by reference in to this description.

A culling element in the form of an elongated powered roller 54 extends along the length of the culling conveyor in the upstream portion and is aligned laterally closer to the elevated side edge 28 of the tilted conveyor belt 24 than with the horizontal conveyor 32. The powered roller is rotated continuously in the direction indicated by arrow 56 in FIG. 4. A vertical gap 58 between the bottom of the powered roller 54 and the tops of the belt rollers 38 is large enough to allow flat packages F to pass through, but not non-flat packages N. The powered roller 54 rotates in a direction that pushes the faces 60 of the non-flat packages that come in contact with the side of the roller opposite the first side 44 upward. This causes the non-flat package to pivotally lift off flat packages it is stacked on to allow them to be propelled through the gap across the belt in the direction of arrow 62 and over the first side 44 onto a chute or tilted tray 64 (FIG. 3) for removal.

Figure 5:
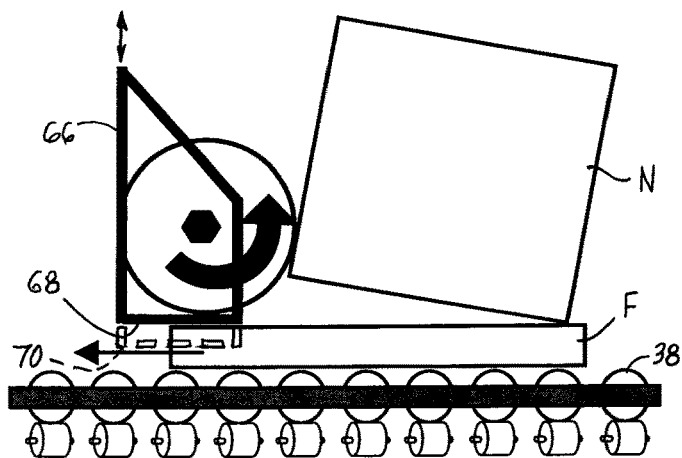
FIG. 5 is a front elevation schematic as in FIG. 4, showing the powered roller with a guard and rollers in the conveyor belt passing flat packages under the guard.
Figure 6:
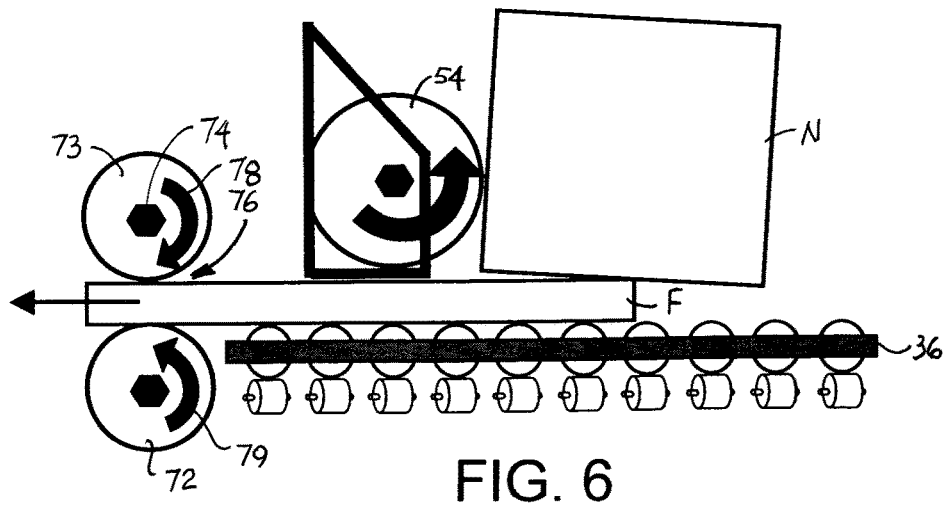
FIG. 6 is a front elevation schematic as in FIG. 5 with powered ejection rollers to help pull flat packages from under a stack.

To prevent flat packages from encountering the powered roller 54, which would tend to eject a flat package out of the gap the wrong way, the powered roller is outfitted with a guide 66 having a bottom surface 68 that prevents flat packages F passing through the gap from contacting the roller, as shown in FIG. 5. The vertical position 70 of the guide 66 may be adjusted to set the maximum thickness of flat packages allowed to pass through the gap. The maximum thickness is the distance between the bottom surface 68 of the guide and the tops of the belt rollers 38 in the roller conveyor belt.

To further help pull flat packages F through the vertical gap under the powered roller 54, one or more powered ejection rollers 72, 73 with axes of rotation 74 parallel to the powered roller 54, may be positioned at the first side of the roller belt 36. The ejection rollers draw the flat package F in the gap with a pinch point 76 between each other and pull the flat package through the gap and eject it onto the flat-package collection chute 64. In this way, the ejection rollers supplement the belt rollers 38 in moving flat articles through the gap under the powered roller 54. Both ejection rollers may be powered to counterrotate as indicated by arrows 78, 79 in FIG. 6, or one of the ejection rollers could be a passive pinch roller biased toward the powered ejection roller.

In some instances, only the upstream portion 41 of the final culling conveyor 34 may be required. But if a lot of side-by-side packages present a problem, the downstream portion 43 can be used with a similar powered roller 55 to form a two-stage culling conveyor. The downstream powered roller 55 extends along the length of the downstream portion of the culling conveyor laterally offset from the upstream power roller 54 and closer to the second side 45 rotating in the opposite direction to lift the side-by-side non-flat packages that were blocked by other packages from engaging the upstream powered roller. The belt rollers 38 in the downstream portion push the conveyed packages toward the second side of the roller belt with the blocked, side-by-side, non-flat packages the first to hit the downstream powered roller. Except that flat packages in the downstream portion are passed under the rollers onto a collection chute 65 at the second side of the conveyor, the powered rollers in both portions operate similarly. The taller non-flat packages that cannot pass through the vertical gaps between either powered roller and the belt rollers are confined by the powered rollers to the roller belt 36 and exit off its exit end 80. Thus, the conveyor system automatically separates flat packages from non-flat packages.

Figure 7:
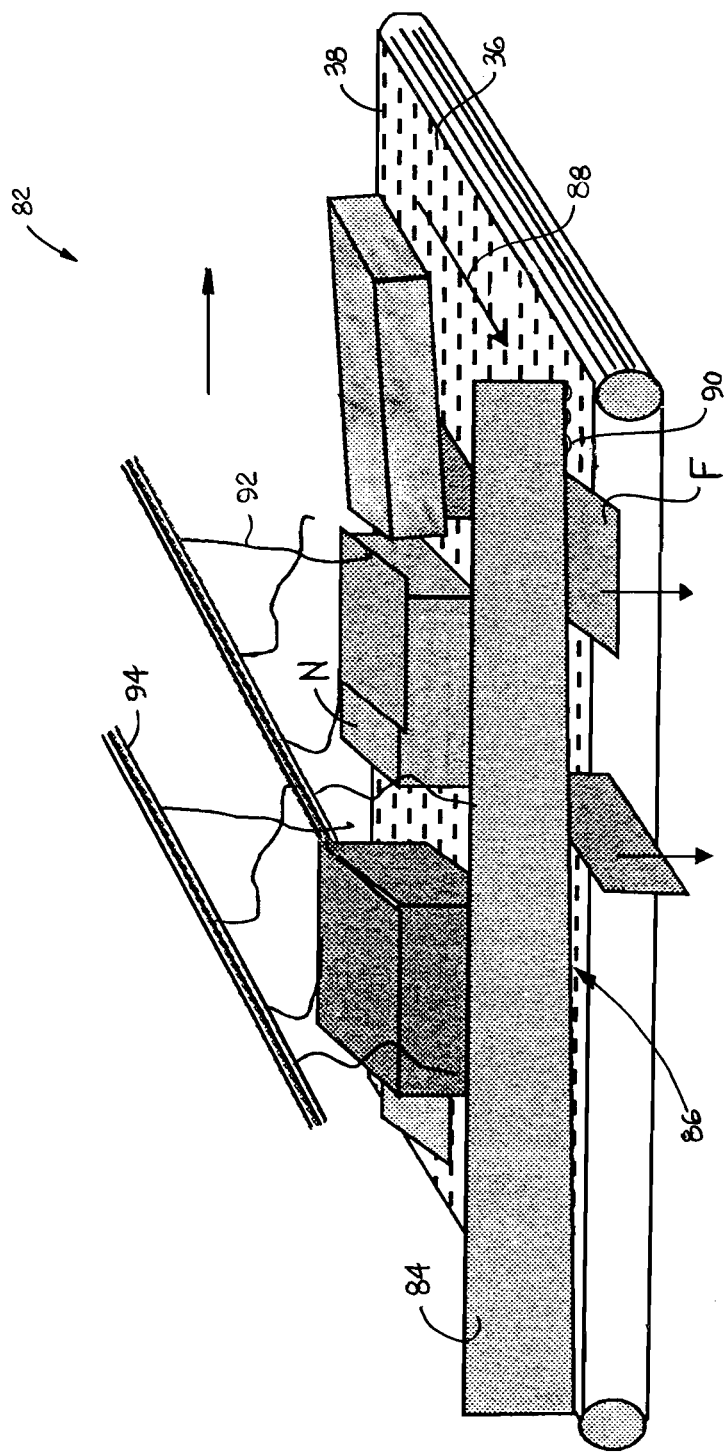
FIG. 7 is an oblique view of another version of a culling conveyor as in FIG. 3, embodying features of the invention, including a side rail, rather than a powered roller, used as a culling element.

Another version of a culling conveyor is shown in FIG. 7. The culling conveyor 82 is identical to the upstream portion of the culling conveyor of FIG. 3, except that the culling element is realized as a side guard 84 rather than a powered roller. The side guard, which is shown as a vertical wall, may be positioned above the surface of the roller conveyor belt 36 or just outside the side edge of the belt. A gap 86 between the bottom of the side guard and the belt rollers 38 in the roller conveyor belt permits flat packages F to be pushed under the side guard and through the gap by the belt rollers rotating in the direction of arrow 86. The flat packages that pass through the gap fall off the side of the belt onto a tilted tray or chute as in FIG. 3. The taller non-flat packages N are blocked by the side guard and conveyed downstream on the roller conveyor belt, where they can be collected or passed to a similar downstream culling-conveyor portion in which the belt rollers rotate in the opposite direction and the side rail is along the opposite side of the conveyor, as in the downstream portion of the culling conveyor of FIG. 3. The gap may be constant, for example, 0.25 in, along the length of the culling conveyor or may increase with distance downstream to help unstack flat packages resting atop other flat packages. Rollers 90 protruding from the bottom of the side guard may be used to provide low-friction, rolling contact with the flat packages. Alternatively, the side guard may be made of a low-friction, wear-resistant material, such as UHMW plastic. Strings 92, or danglers, dangling from positions on bases 94 mounted above the roller conveyor belt drag over the tops of the packages being conveyed along the culling conveyor. The danglers drag flat packages off the tops of non-flat packages and onto the belt rollers.

Although the invention has been described in detail with respect to one version, other versions are possible. For example, the incline conveyor could deposit packages onto the tilted conveyor belt over the upstream end of the tilted conveyor belt rather than over its elevated side. As another example, more powered-roller portions could be added to the culling conveyor to provide more opportunities to remove side-by-sides. And the culling conveyor could comprise one roller conveyor belt with upstream actuating rollers arranged to rotate the belt rollers in one direction and downstream actuating rollers arranged to rotate the belt rollers in the opposite direction, or the culling conveyor could comprise upstream and downstream conveyor belts whose rollers are actuated to rotate in opposite directions. Furthermore, the culling conveyor can be used independently of the incline, tilted, and horizontal collection conveyors, and vice versa. So, as these few examples suggest, the scope of the claims is not meant to be limited to the details of the specific version used to describe the invention.

What is claimed is:

1. A conveyor system comprising: a conveyor belt having a flat conveying surface advancing packages up an incline from a lower end to an upper end;
   a plurality of stop elements extending across the width of the conveying surface of the conveyor belt at spaced apart locations along the length of the conveyor belt to block packages sliding down the inclined conveying surface;
   a titled conveyor belt having an outer conveying surface extending in width from an elevated side edge to a lower side edge and advancing in a direction of belt travel parallel to the elevated and lower side edges, wherein the upper end of the conveyor belt advancing on the incline is elevated above the elevated side edge of the titled conveyor belt to feed packages onto the titled conveyor belt; wherein the conveyor belt advances up the incline with a continuous pulsing motion by continuously starting and stopping the conveyor to help unstack stacked packages on the conveying surface.

2. A conveyor system as in claim 1 wherein the stop elements are periodically spaced apart on the conveyor belt at regular intervals.

3. A conveyor system as in claim 1 wherein the stop elements are flights upstanding from the conveying surface.

4. A conveyor system as in claim 1 wherein the stop elements are friction pads on the conveying surface.

5. A conveyor system as in claim 1 wherein the conveyor belt is inclined at an inclination angle sufficient to allow non-flat packages to tumble back until stopped by the stop elements.

6. A conveyor system as in claim 1 wherein the stop elements extend part way across the width of the conveyor belt with the stop elements on the left-side half of the conveyor belt staggered along the length of the conveyor belt from the stop elements on the right-side half.

7. A method for unstacking packages being conveyed up an incline, comprising:
   arranging a conveyor belt having spaced apart stop elements extending across the width of a flat conveying surface at spaced apart locations along the length of the conveyor belt on an incline from a lower end to an upper end;
   advancing the conveyor belt up the incline in a continuous pulsing motion by continuously starting and stopping the conveyor belt to cause packages stacked atop other packages on the conveying surface to slide downward on the conveying surface of the conveyor belt on the incline;
   stopping the downward slide of the previously stacked packages with the stop elements.

8. The method of claim 7 comprising stopping the stacked packages with flights extending upward from the conveying surface at regularly spaced intervals.

9. The method of claim 7 comprising stopping the stacked packages with friction pads disposed on the conveying surface at regularly spaced intervals.

10. The method of claim 7 further comprising feeding packages off the upper end of the conveyor belt onto a tilted conveyor belt having an elevated side adjacent to the upper end of the conveyor belt and an opposite lower side across the width of the conveyor belt.

\* \* \* \* \*

UNITED STATES PATENT AND TRADEMARK OFFICE
CERTIFICATE OF CORRECTION

PATENT NO. : 10,183,814 B2  
APPLICATION NO. : 14/925497  
DATED : January 22, 2019  
INVENTOR(S) : Matthew L. Fourney and Stephen G. Wargo Page 1 of 1

It is certified that error appears in the above-identified patent and that said Letters Patent is hereby corrected as shown below:

In the Claims

Column 5 Line 44, Column 6 Lines 1 and 2 in Claim 1, Lines 9, 15, and 16:
Delete "titled" and insert -- tilted --.

Column 6 Lines 4-5, in Claim 1, Line 19:
Insert -- belt -- between "conveyor" and "to help".

Signed and Sealed this  
Nineteenth Day of February, 2019

Andrei Iancu  
*Director of the United States Patent and Trademark Office*